March 30, 1954

R. H. DOBBS 2,673,635

SUPPORT FOR VEHICLE LOADING SKIDS

Filed June 5, 1953

RICHARD H. DOBBS
INVENTOR.

BY

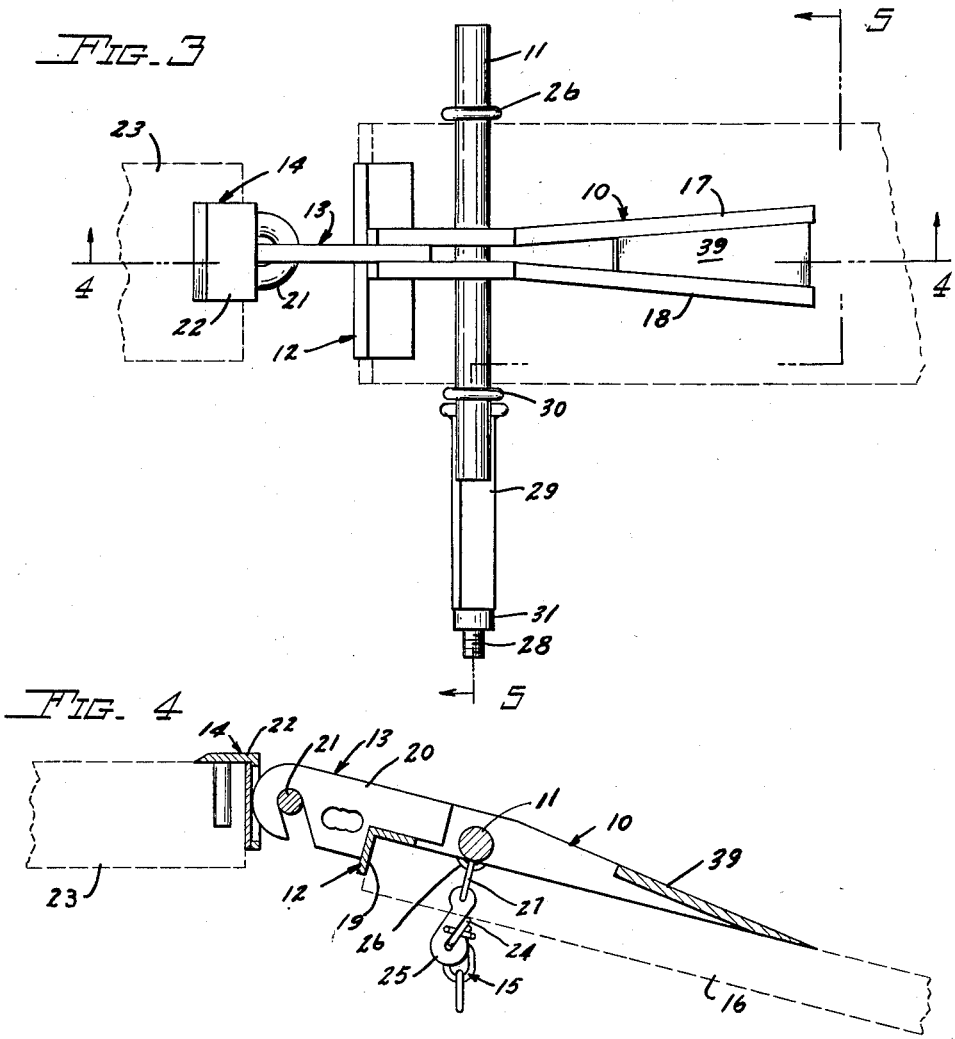
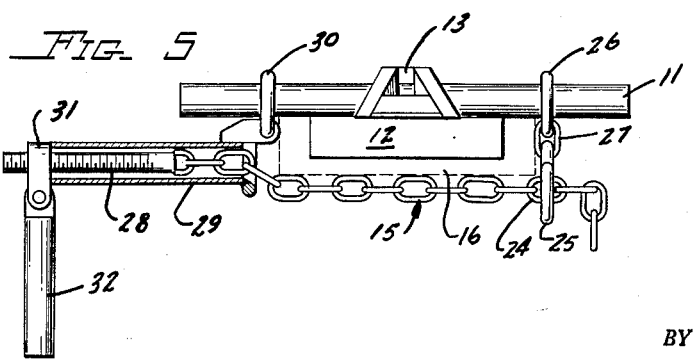

Patented Mar. 30, 1954

2,673,635

UNITED STATES PATENT OFFICE 2,673,635

SUPPORT FOR VEHICLE LOADING SKIDS

Richard H. Dobbs, Winfield, Kans.

Application June 5, 1953, Serial No. 359,872

8 Claims. (Cl. 193—41)

This invention relates to a device for temporarily supporting one end of a loading skid on an elevated platform or vehicle so that heavy objects, such as oil well casing sections, may be moved upward on the skid to the elevated surface. It is an improvement over the skid holder protected by my Patent No. 2,559,712, issued July 10, 1951.

It is an important object of the invention to provide a skid holder which can be easily and firmly secured to an end of skids of varying cross sectional shapes and sizes, and which can then be secured to an elevated platform, such as a vehicle body, or can be rested upon a portion of the edge of such platform, or upon cargo already loaded on the platform, to thus support the attached end of the skid while additional cargo is moved upward over the skid from the ground or other lower supporting surface.

It is an additional object of the invention to provide a skid holder the upper surface of which is so contoured as to present practically no interference to the rolling or skidding of cargo from the skid proper over the holder to the vehicle body.

It is an additional object to provide a skid holder of extremely rugged construction, including the means for securing the holder to the skid —a holder which is capable of standing up indefinitely under heavy commercial use.

The invention, together with other objects, will be more clearly understood when the following description is read in connection with the accompanying drawings, in which:

Fig. 3 is a top plan view of a skid holder embodying my invention attached to a skid and anchored to a portion of a vehicle, the skid proper and the vehicle being shown fragmentarily in broken lines;

Fig. 4 is a vertical sectional view taken along the line 4—4 of Fig. 3;

Fig. 5 is a rear end view of the holder, with parts in section along the line 5—5 of Fig. 3;

Figure 1:
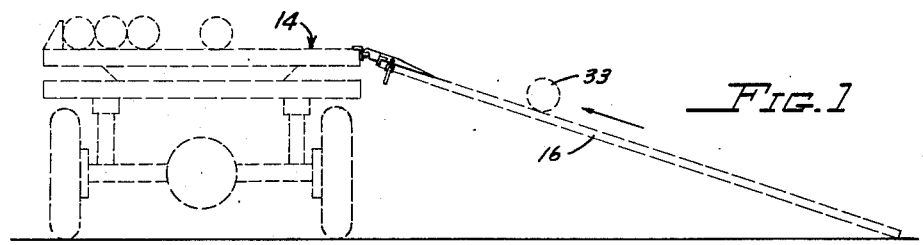
Figs. 1 and 2 are side elevations illustrating two different manners of using the skid holder of this invention to load cargo on a vehicle, the vehicle, the cargo, and the skid proper being shown in broken lines.

Referring particularly to Figs. 3 to 5, it will be seen that the embodiment of the invention illustrated includes generally an elongated rigid beam 10; a cross bar 11 secured rigidly to the beam intermediate its ends, preferably in such position that the nether surfaces of cross bar and beam lie in a common plane; a transverse stop 12 secured rigidly to the beam forward of the cross bar; and means 13 secured to the forward end of the beam, aligned longitudinally therewith, and projecting forward beyond stop 12 for contact with a load supporting structure 14 to support the holder and hence the end of a skid to which the holder is secured; and a flexible member 15 having spaced portions secured to the cross bar on opposite sides of the beam for embracing the end of a skid 16 to secure the entire holder thereto firmly.

Beam 10 is preferably made up of a pair of spaced heavy plates, 17 and 18, which diverge toward the rear end of the beam. A transverse plate 39 has its side edge rigidly secured, as by welding, to the aft portions of plates 17 and 18, and serves as a spacer. The cross bar 11 passes through aligned perforations in the respective plates, and is likewise welded thereto.

An angle iron is welded transversely to the forward ends of plates 17 and 18, with one flange 19 depending below the plane of the lower planar surface of the beam. It serves to abut the extreme end of a skid 16 when the holder is mounted thereon, as shown in Fig. 4.

In Figs. 3 and 4, the structure contacting means 13 is in the form of a heavy downwardly open hook 20, the shank of which is positioned between the forward ends of plates 17 and 18, as shown in Fig. 3, and is welded thereto, as well as to the stop 12. This hook is aligned with the longitudinal axis of beam 10, and projects forward of stop 12. It may engage the ring or staple 21 of a bracket 22, designed to seat on an end of a bolster 23 of a vehicle. The hook 20 thus serves to contact a load supporting structure, supports the entire holder therefrom, and the holder supports an end of the loading skid.

The flexible member 15 is shown in the form of a chain which has one ling 24 removably secured in a hook 25, which is in turn removably secured to an end of cross bar 11 by means of a ring 26 and a connecting link 27.

As a means of tightening the chain about a skid to firmly clamp the entire holder thereon, the opposite end of the chain is secured to a threaded bar 28. Bar 28 and chain 15 are both freely movable longitudinally in a tubular housing 29, the inner end of which is removably secured to cross bar 11 by means of a heavy ring 30. Bar 28 is forcibly moved to tighten the chain by means of a nut 31 which bears against the outer end of tube 29. The nut 31 is provided with a pivotally attached lever type handle 32.

The manner of attaching the holder to a skid 16 is clearly illustrated in Figs. 3, 4, and 5. It will be noted that the bottom surface of beam 10 is planar, and that the rear portion of the upper surface is gently inclined downwardly and rearwardly to meet the bottom surface at an acute angle. Also the top edge of hook 20 lies in the same plane as the top surface of the forward end of beam 10. The holder is placed on a skid so that flange 19 abuts the skid end, and so that beam 10 extends centrally and longitudinally toward the opposite end of the skid. With the holder thus clamped on an end of a skid, and the holder supported by hook 20 on any load supporting structure, heavy objects, such as oil well casing 33 (Fig. 1), may be moved upward on the skid, over the upper surface of the holder, and onto the supporting structure without any material interference from the holder itself.

Figure 6:
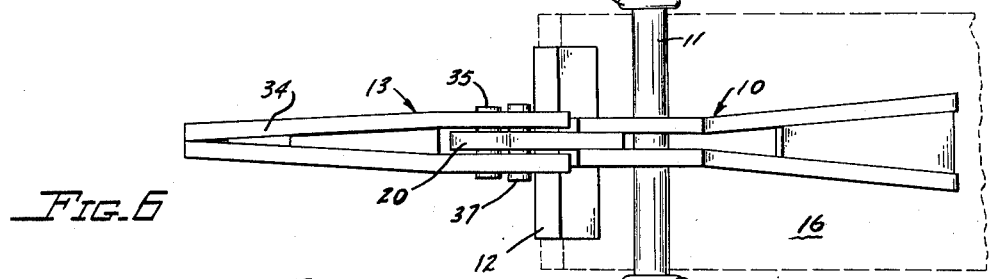
Figs. 6 and 7 are respectively top plan and side elevations of the holder showing further details of construction including a cargo anchor which constitutes a portion of its forward end.

In Figs. 6 and 17, the means 13 for contacting a load supporting structure includes an elongated rigid bill 34 which is bifurcated at its rear end to receive hook 20, as shown. Bill 34 is provided at its rear end with a rigid cross pin 35 onto which the hook 20 attaches.

Figure 7:
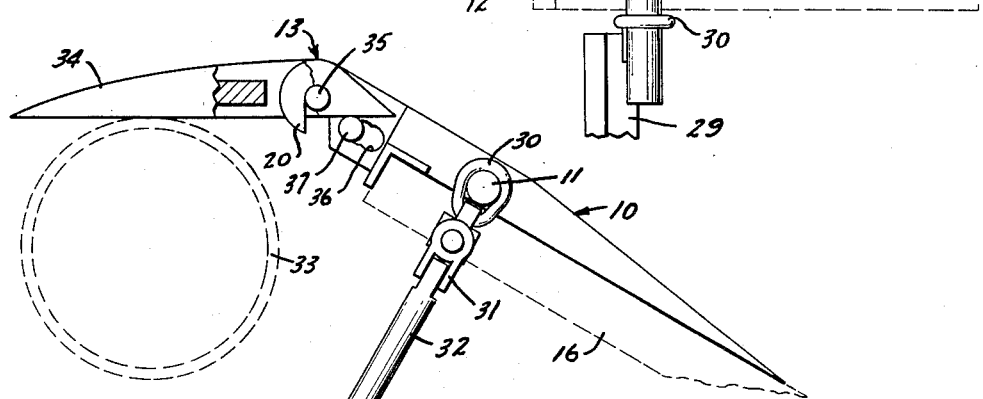

The shank of hook 20 is provided with an elongated slot 36, the edges of which are serrated, as clearly shown in Fig. 7. A rigid pin 37 of the proper diameter is received at a selected location in slot 36, and serves as a rest or stop for the aft end of bill 34. By changing the location of pin 37 in its slot, the angular position of bill 34 with relation to the beam 10 may be selectively changed.

Figure 2:
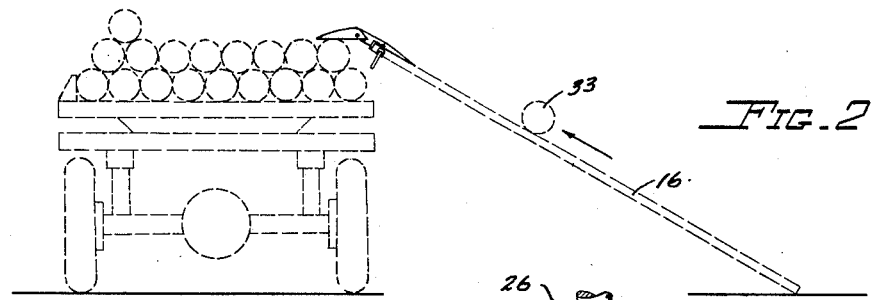

As will be understood by those familiar with this art, the object of providing the removable bill 34 is to enable the holder to contact a portion of a load already loaded on a supporting structure, as clearly illustrated in Fig. 2, so that additional cargo may be moved upward on the skid and over the holder to a position atop the cargo which has already been loaded.

From the above description, it will be seen that the invention provides a device which can be easily and firmly secured to one end of a loading skid and then placed in contact with a load supporting structure to hold the skid in an inclined position so that cargo can easily be moved upward over the skid to the supporting structure.

Having described the invention with sufficient clarity to enable those familiar with this art to construct and use it, I claim:

1. A holder for attachment to one end of a loading skid for supporting that end on an elevated structure onto which it is desired to transfer a load, comprising: an elongated rigid beam adapted to seat flat against the upper surface of one end of a skid and to extend centrally and longitudinally inward from that end; a transverse stop secured rigidly to said beam near its forward end, and depending below the lower beam surface to abut the extreme end of the skid; forwardly projecting means secured to said beam forward of said stop for contacting a structure capable of supporting a load to in turn support the holder and hence the end of the skid; a rigid crossbar rigidly secured to and projecting from both sides of the beam aft of the stop; and an elongated flexible member having spaced portions secured to said crossbar at points on opposite sides of said beam, and adapted to embrace the end portion of a skid on which said beam is mounted, with the extreme end of the skid abutting said stop.

2. The holder described in claim 1 in which the said forwardly projecting means includes an elongated bill which is angularly adjustable in the vertical plane in which the beam lies.

3. The holder described in claim 1, and means for applying tension to the flexible member to firmly secure the beam to the end of a skid.

4. A holder for attachment to one end of a loading skid for supporting that end on an elevated structure onto which it is desired to transfer a load, comprising: an elongated rigid beam adapted to seat flat against the upper surface of a skid and to extend centrally and longitudinally inward from one end thereof; a transverse stop secured rigidly to said beam near its forward end, and depending below the lower beam surface to abut the extreme end of a skid; a downwardly opening attaching hook rigidly secured to said beam forward of said stop, for contacting a structure capable of supporting a load; a rigid crossbar rigidly secured to and projecting from both sides of the beam aft of the stop; and an elongated flexible member having spaced portions secured to said crossbar at points on opposite sides of said beam, and adapted to embrace the end portion of a skid on which said beam is mounted, with the extreme end of the skid abutting said stop.

5. A holder for attachment to one end of a loading skid for supporting that end on an elevated structure onto which it is desired to transfer a load, comprising: a rigid central beam having an integral downwardly opening hook at its forward end; a transverse plate extending beyond both sides of and disposed at right angles with relation to the beam and depending below the nether surface thereof at a location near the hook, said plate adapted to abut an end of a skid with the rear portion of the beam extending centrally and longitudinally along the upper surface of the skid toward its opposite end; a rigid crossbar extending laterally from both sides of said beam at a location spaced rearward from said plate; and an elongated flexible member having spaced portions secured to said crossbar on opposite sides of the beam to embrace the end portion of a skid on which said beam is mounted, and to thus secure the beam to the skid.

6. The holder described in claim 5, and means for tightening said flexible member to firmly grip a skid.

7. A skid holder comprising: a substantially cross shaped member which includes an elongated central beam, and a rigid cross bar extending laterally from both sides thereof at a location intermediate the beam ends; a downwardly opening hook rigidly secured to the forward end of the beam; a rigid transverse stop extending beyond both sides of said beam at a location adjacent the hook and forward of the crossbar, said stop depending below the lower surface of said beam; and an elongated flexible skid embracing member having spaced portions secured to said crossbar on opposite sides of said beam to clamp the butt end of a skid against the stop, and the adjacent upper surface of the end of a skid along the nether surface of the beam, with the hook projecting beyond said butt end of the skid.

8. The holder described in claim 7 in which the rear portion of the upper surface of the beam is inclined downwardly and rearwardly to meet the bottom surface thereof at an acute angle.

RICHARD H. DOBBS.

No references cited.